US007237024B2

(12) United States Patent
Toomey

(10) Patent No.: US 7,237,024 B2
(45) Date of Patent: Jun. 26, 2007

(54) CROSS-SITE TIMED OUT AUTHENTICATION MANAGEMENT

(75) Inventor: Christopher Newell Toomey, Cupertino, CA (US)

(73) Assignee: AOL LLC, Dulles, VA (US)

(*) Notice: Subject to any disclaimer, the term of this patent is extended or adjusted under 35 U.S.C. 154(b) by 762 days.

(21) Appl. No.: 10/272,033

(22) Filed: Oct. 15, 2002

(65) Prior Publication Data
US 2004/0073660 A1   Apr. 15, 2004

(51) Int. Cl.
G06F 15/173   (2006.01)
(52) U.S. Cl. .................................. 709/224; 709/225
(58) Field of Classification Search ........ 709/200–201, 709/225
See application file for complete search history.

(56) References Cited

U.S. PATENT DOCUMENTS

| 5,966,705 | A | 10/1999 | Koneru et al. ............. 707/9 |
| 5,974,549 | A | 10/1999 | Golan ...................... 713/200 |
| 6,035,332 | A | 3/2000 | Ingrassia, Jr. et al. ...... 709/224 |
| 6,052,730 | A | 4/2000 | Felciano et al. ........... 709/225 |
| 6,073,241 | A | 6/2000 | Rosenberg et al. ......... 713/201 |
| 6,115,742 | A | 9/2000 | Franklin et al. ........... 709/224 |
| 6,138,157 | A | 10/2000 | Welter et al. ............. 709/224 |
| 6,148,333 | A | 11/2000 | Guedalia et al. .......... 709/219 |
| 6,256,739 | B1 | 7/2001 | Skopp et al. ............. 713/201 |
| 6,281,790 | B1 | 8/2001 | Kimmel et al. ............ 340/506 |
| 6,286,046 | B1 | 9/2001 | Bryant .................... 709/224 |
| 6,313,855 | B1 | 11/2001 | Shuping et al. ........... 345/854 |
| 6,330,566 | B1 | 12/2001 | Durham ................... 707/104 |
| 6,341,310 | B1 | 1/2002 | Leshem et al. ............ 709/223 |
| 6,366,298 | B1 | 4/2002 | Haitsuka et al. .......... 345/736 |
| 6,393,479 | B1 | 5/2002 | Glommen et al. .......... 709/224 |
| 6,405,252 | B1 | 6/2002 | Gupta et al. ............. 709/224 |

(Continued)

FOREIGN PATENT DOCUMENTS

| EP | 1 041 768 | 10/2000 |
| JP | 2002-7261 | 1/2000 |
| WO | WO 00/36812 | 6/2000 |

OTHER PUBLICATIONS

*Secure Cookies on the Web*; Joon S. Park and Ravi Sanhu; Internet Computing; Jul./Aug. 2000.

(Continued)

*Primary Examiner*—Jason Cardone
*Assistant Examiner*—Minhchau Nguyen
(74) *Attorney, Agent, or Firm*—Michael A. Glenn; Glenn Patent Group

(57) ABSTRACT

A solution is provided to monitor Web browsing activity across an Internet based network of affiliated Web sites and to enable the Web sites to detect and to force re-authentication upon users who have had a period of network-wide inactivity longer than a site-specific maximum allowable inactivity period. The network comprises at least one network authentication server (NAS) which maintains a network-wide activity tracking (NATr) cookie. The NATr cookie comprises a set of network-wide activity tracking (NATr) parameters for each registered user. Each of the Web sites maintains a site-specific activity tracking (SATr) cookie which comprises a set of site-specific activity tracking (SATr) parameters for each registered user. The NATr parameters for each user are reset whenever the user authenticates to the network. When a user requests a page from a site, an NAS forces the user to re-authenticate when the NAS determines that the user's network-wide inactivity duration is longer than the site's maximum allowable inactivity period.

21 Claims, 9 Drawing Sheets

U.S. PATENT DOCUMENTS

| | | | |
|---|---|---|---|
| 6,446,119 B1 | 9/2002 | Olah et al. | 709/224 |
| 6,516,416 B2* | 2/2003 | Gregg et al. | 726/8 |
| 6,678,731 B1* | 1/2004 | Howard et al. | 709/225 |
| 6,718,328 B1* | 4/2004 | Norris | 707/9 |
| 6,859,834 B1* | 2/2005 | Arora et al. | 709/227 |
| 6,877,095 B1* | 4/2005 | Allen | 713/182 |
| 2002/0028706 A1 | 3/2002 | Barnard et al. | 463/26 |
| 2002/0029269 A1* | 3/2002 | McCarty et al. | 709/225 |
| 2002/0095222 A1 | 7/2002 | Lignoul | 700/13 |
| 2002/0133697 A1 | 9/2002 | Royer et al. | 713/150 |
| 2002/0146129 A1 | 10/2002 | Kaplan | 380/270 |
| 2002/0178186 A1* | 11/2002 | Parry | 707/513 |

OTHER PUBLICATIONS

*An Internet-Enabled Knowledge Discovery Process*; Alex G. Buchner, Maurice D. Mulvenna, Sarab S. Anand, and John G. Hughes.

*The Order of Things: Activity-Centered Information Access*; Matthew Chalmers, Kerry Rodden & Dominique Brodbeck.

*Cookies nd Web Browser Design: Toward Realizing Informed Consent Online*; L.I. Millett, B. Friedman, and E. Felten; Proceedings of the CHI 2001; Mar. 31-Apr. 5, 2001.

*Informed Consent in the Mozilla Browser: Implementing Value-Sensitive Design*; B. Friedman, D.C. Howe, and E. Felten; Proceedings of the 35th Annual Hawaii International Conference on System Sciences.

*A Cookie Manager Class for Web Applications*; B.G. Padamadan; C/C++ Users Journal; Aug. 2001.

*JavaScript Cookies*; C.B Tichenor; Dr. Dobb's Journal; May 1997.

*An Environment for Security Protocol Intrusion Detection*; Alec Yasinsac.

\* cited by examiner

CROSS-SITE TIMED OUT AUTHENTICATION MANAGEMENT

BACKGROUND OF THE INVENTION

1. Technical Field

The invention relates generally to Internet based authentication technology. More particularly, the invention relates to a method and system for monitoring Web browsing activity across an Internet based network of affiliated sites and for enabling said sites to detect and to force re-authentication upon a user who has had a period of network-wide inactivity longer than a site-specific maximum allowable inactivity period.

2. Description of the Prior Art

To request a service or conduct other electronic transaction in an Internet based network, a user is usually required to go through an authentication process. In other words, the user must provide the seller or service provider with some information such as his personal identification, contact information, or even financial information. The authentication process may take from several seconds to several minutes. Because each seller or service provider usually maintains its own authentication server and database, millions of sellers and service providers might share thousands or millions of consumers or users. Some of the consumers or users might be required to go through the same or substantially similar authentication process again and again if they have transactions with many sellers or service providers. This repetitive authentication not only wastes consumers' precious time, but also burdens the sellers or service providers because they have to expand their databases to keep detailed authentication information for a growing number of users. This situation brings forth a technical need to create a universal, unified, single-logon infrastructure wherein a specific user may be authenticated once for all and the authentication result is widely recognized by a large number of sellers or service providers.

In responding to that need, several approaches have been developed. For example, Microsoft Corporation has introduced a ".NET Passport" single sign-in system. With ".NET Passport", a user does not need to register a member name and password at each new site he visits. The user may simply use his e-mail address and password that registered as his ".NET Passport" to sign in to any participating site. The information the user registers with ".NET Passport" is stored online, securely, in the ".NET Passport" database as the user's ".NET Passport profile." When the user signs on to a ".NET Passport" participating site by typing his e-mail address and password in the ".NET Passport" sign-in box, ".NET Passport" confirms that (1) the e-mail address he typed is registered with ".NET Passport", and (2) the password he typed is correct. ".NET Passport" then notifies the site that the user has provided valid "sign-in credentials," and he is given access to the participating site. Once the user signs in to one ".NET Passport" participating site during an Internet session, he can sign in to other sites simply by clicking the ".NET Passport" sign-in button available at each site.

Another example is America Online Incorporated (AOL) 's "Screen Name Service" system, which provides free service allowing anyone with a "Screen Name" to easily and securely register at a variety of Web sites. As with to Microsoft's ".NET Passport" system, the "Screen Name Service" eliminates a user's need to remember multiple names and passwords for all the places he visits on the Web. With the "Screen Name Service" system, each user has a "My Profile", which stores the user's personal information used to make registration at sites across the Web simple and secure. When the user registers at a participating site using the service, he has the opportunity to choose which fields of information stored by AOL, if any, he would like to share with that site. No information is shared with any site without the user's explicit permission. When the user agrees to share certain information with a participating site, that information is conveyed to the site at which he is registering. Another feature is that the user is provided with a "My Site List", which is an effective way to manage personal information because it shows the user with which sites he has registered using the service. The user can view the privacy policy of a site to see how it uses information it knows about the user. The user can also decide if he would like to be signed into the site without being prompted and if the site should be updated with information when "My Profile" changes.

The common characteristic of these approaches is that they implement a centralized solution for authentication and authentication information management. Undoubtedly, the centralized solution may overcome the repetitive authentication and repetitive storage problems that exist in the scattered, disorganized situation.

In these networks, a user's inactivity is typically tracked only upon individual sites versus at the network level, and thus the user who is active in a network but inactive on a particular site gets inadvertently timed out on that site. For example, if the user had not completed and sent his message in Site A before he switched to Site B, after a predefined duration of a single, continuous session is over, his workflow in Site A will interrupted and the data he created in the session will be lost. Because of this, time has been wasted, efficiency lost, resources wasted, and distraction, annoyance and stress increased.

What is desired is a mechanism to monitor Web browsing activity across an Internet based network of affiliated Web sites so that a Web site does not time-out a session for a user who has been inactive in the Web site for period of time longer than a predefined maximum allowable inactivity period $P_{max}$ but his network-wide inactivity duration has not been longer than $P_{max}$, so that the Web site forces the user to re-authenticate if his network-wide inactivity duration has been longer than $P_{max}$.

SUMMARY OF THE INVENTION

This invention provides a method and system for monitoring Web browsing activity across a network of affiliated Web sites and for enabling the Web sites to detect and to force re-authentication upon users who have had a period of network-wide inactivity greater than a site-specific maximum allowable inactivity period, wherein the network comprises at least one network authentication server (NAS). The steps of this method, for example, include: (1) the NAS updates the user's NATr parameters in the NATr cookie upon performance of each activity indicating event by the user in the network; (2) The NAS updates the user's NATr parameters in the NATr cookie upon performance of each activity indicating event by the user in the network; (3) the NAS determines upon request the maximum period of network-wide inactivity experienced by the user since his last network authentication; and (4) The NAS re-authenticates the user if the maximum period of network-wide inactivity exceeds the predefined threshold ($P_{max}$).

In the first preferred embodiment, each of the sites in the network maintains a site-specific activity tracking (SATr) cookie which comprises a set of SATr parameters for each registered user.

In the second preferred embodiment, only the NATr cookies are used, and the SATr cookies are not used at all.

In the third preferred embodiment, neither SATr cookies nor Javascript are used.

DETAILED DESCRIPTION OF THE INVENTION

A typical communications network according to this invention includes a plurality of affiliated sites or service providers, a plurality of clients, and at least one network authentication server (NAS), all coupled to the Internet. NAS maintains a network-wide activity tracking (NATr) cookie which comprises a set of network-wide activity tracking (NATr) parameters for each registered user.

In the first preferred embodiment, each of the affiliated sites maintains a site-specific activity tracking (SATr) cookie which comprises a set of site-specific activity tracking (SATr) parameters for each registered user.

Figure 1:
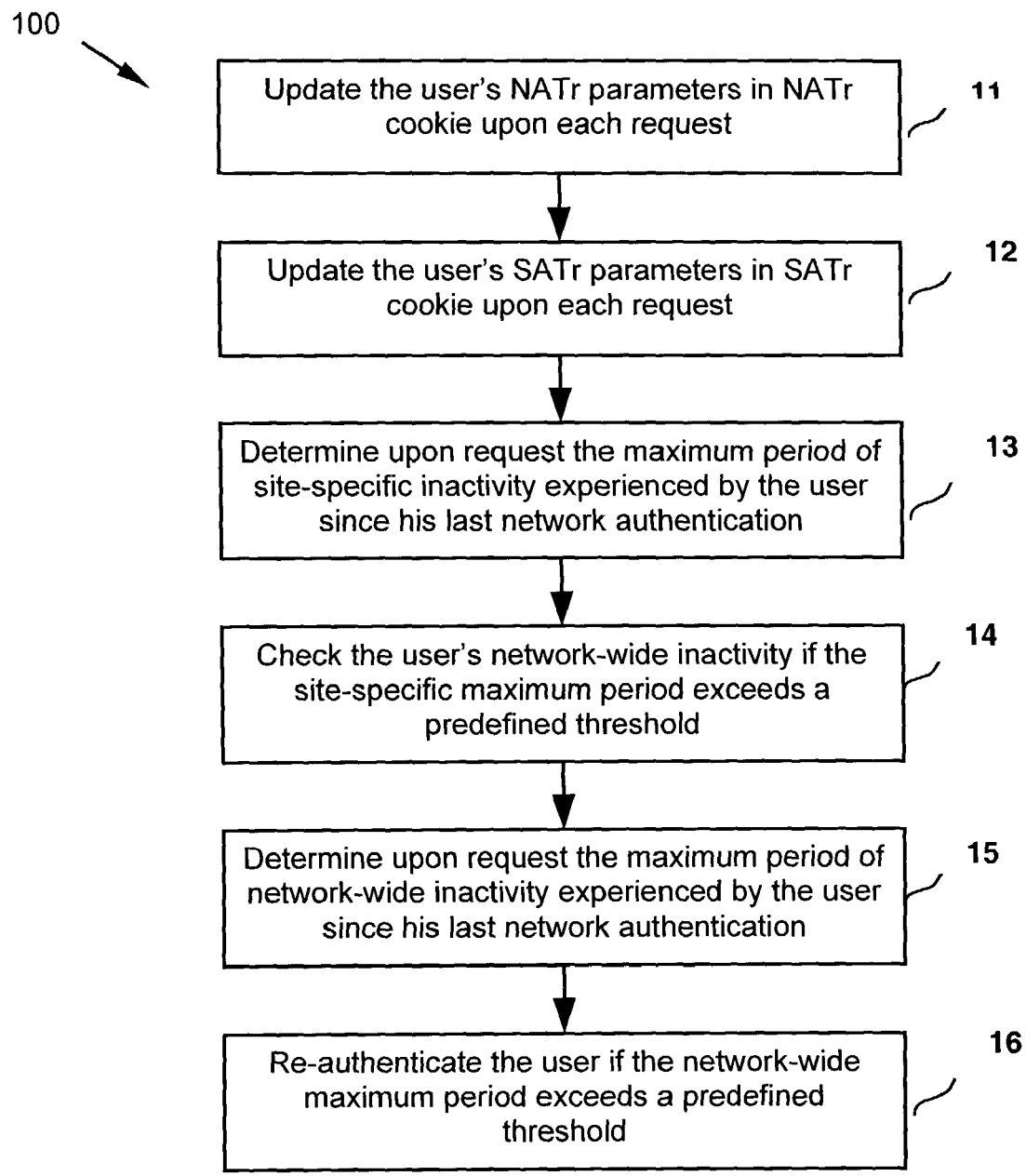
FIG. 1 is a flow diagram illustrating a method 100 for monitoring Web browsing activity across a network and for enabling an affiliated site to detect and to force re-authentication upon a user who has had a period of network-wide inactivity longer than the affiliated site's maximum allowable inactivity duration in the first preferred embodiment where the SATr cookies are used according to the invention.

FIG. 1 is a flow diagram illustrating a method 100 for monitoring Web browsing activity across a network and for enabling an affiliated site to detect and to force re-authentication upon a user who has had a period of network-wide inactivity longer than the affiliated site's maximum allowable inactivity duration in the first preferred embodiment. The method 100 includes the following steps:

Step 11. The NAS updates the user's NATr parameters in the NATr cookie upon performance of each activity indicating event by the user in the network;

Step 12. The site updates the user's SATr parameters in the SATr cookie upon performance of each activity indicating event by the user in the site;

Step 13. The site determines upon the browser's request the maximum period of the site-specific inactivity experienced by the user since his last network authentication;

Step 14. The NAS checks the user's network-wide inactivity if the maximum period of site-specific inactivity exceeds a predefined threshold ($P_{max}$);

Step 15. The NAS determines upon request the maximum period of network-wide inactivity experienced by the user since his last network authentication; and Step 16. The NAS re-authenticates the user if the maximum period of network-wide inactivity exceeds the predefined threshold ($P_{max}$).

FIGS. 2–7 are flow diagrams which collectively illustrate a method 100A, which is a variant of the method 100 in the first preferred embodiment where the SATr cookies are used.

Figure 2:
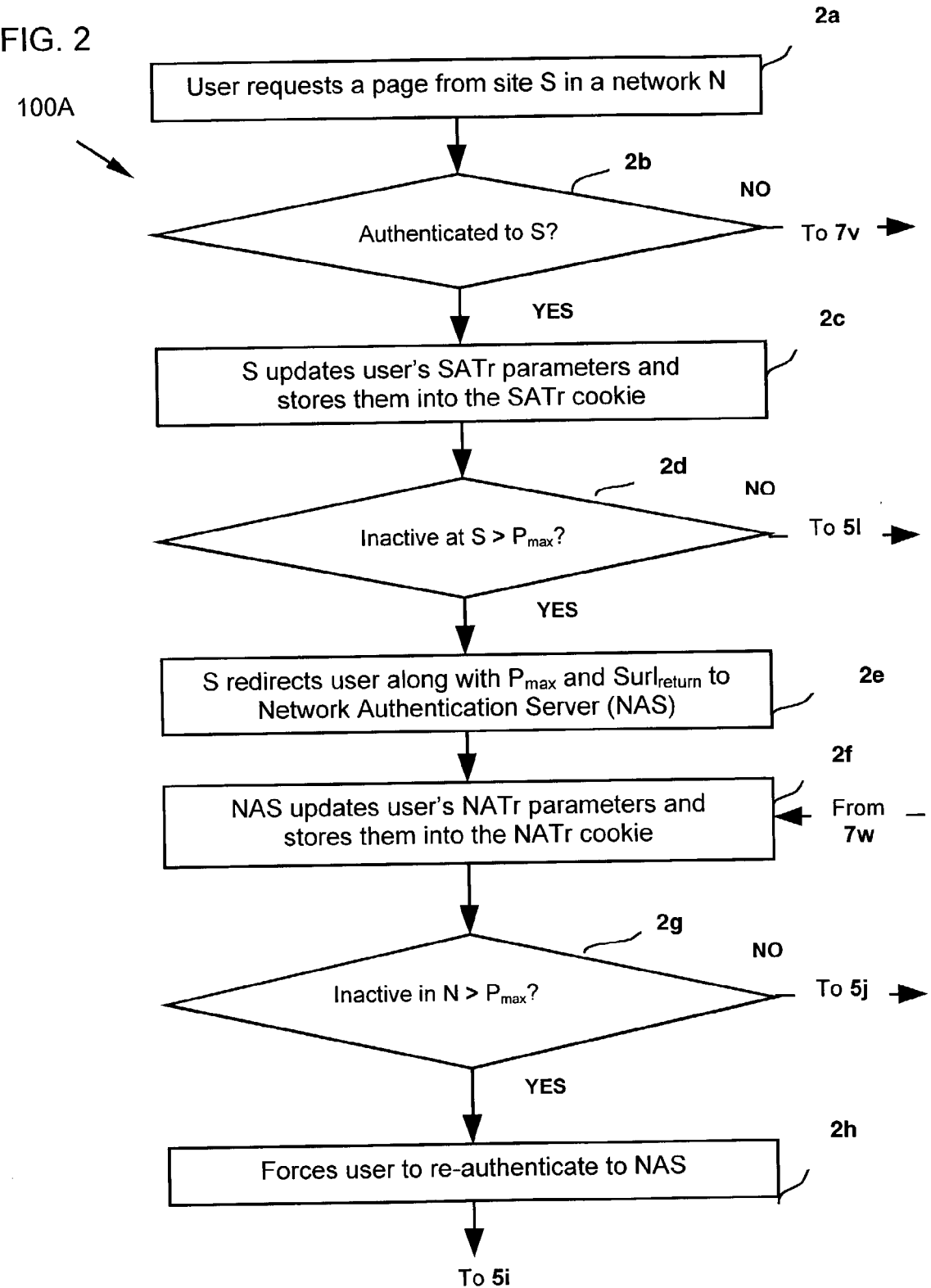
FIGS. 2–7 are flow diagrams which collectively illustrate a method 100A with detailed steps in the first preferred embodiment where the SATr cookies are used.

Referring to FIG. 2, the mainstay steps of the method include:

Step 2a: The user requests a page from a site (S) in the network N;

Step 2b: S checks whether the user has already been authenticated at S;

Step 2c: If the result in Step 2b is yes, then S updates the user's SATr parameters and stores them into the SATr cookie;

Step 2d. S checks the SATr cookie to determine whether the user has been inactive at S for longer than its maximal allowable inactivity period $P_{max}$;

Step 2e: If the result in Step 2d is yes, then S redirects the user along with the $P_{max}$ and $SUrl_{return}$ to a NAS associated with N to check the user's network-wide activity;

Step 2f: The NAS updates the user's NATr parameters and stores them into the NATr cookie;

Step 2g: The NAS inspects the user's NATr parameters in the NATr cookie to determine whether the user has been inactive for longer than the $P_{max}$; and Step 2h: if the result in Step 2g is yes, then S forces the user to re-authenticate.

Figure 3:
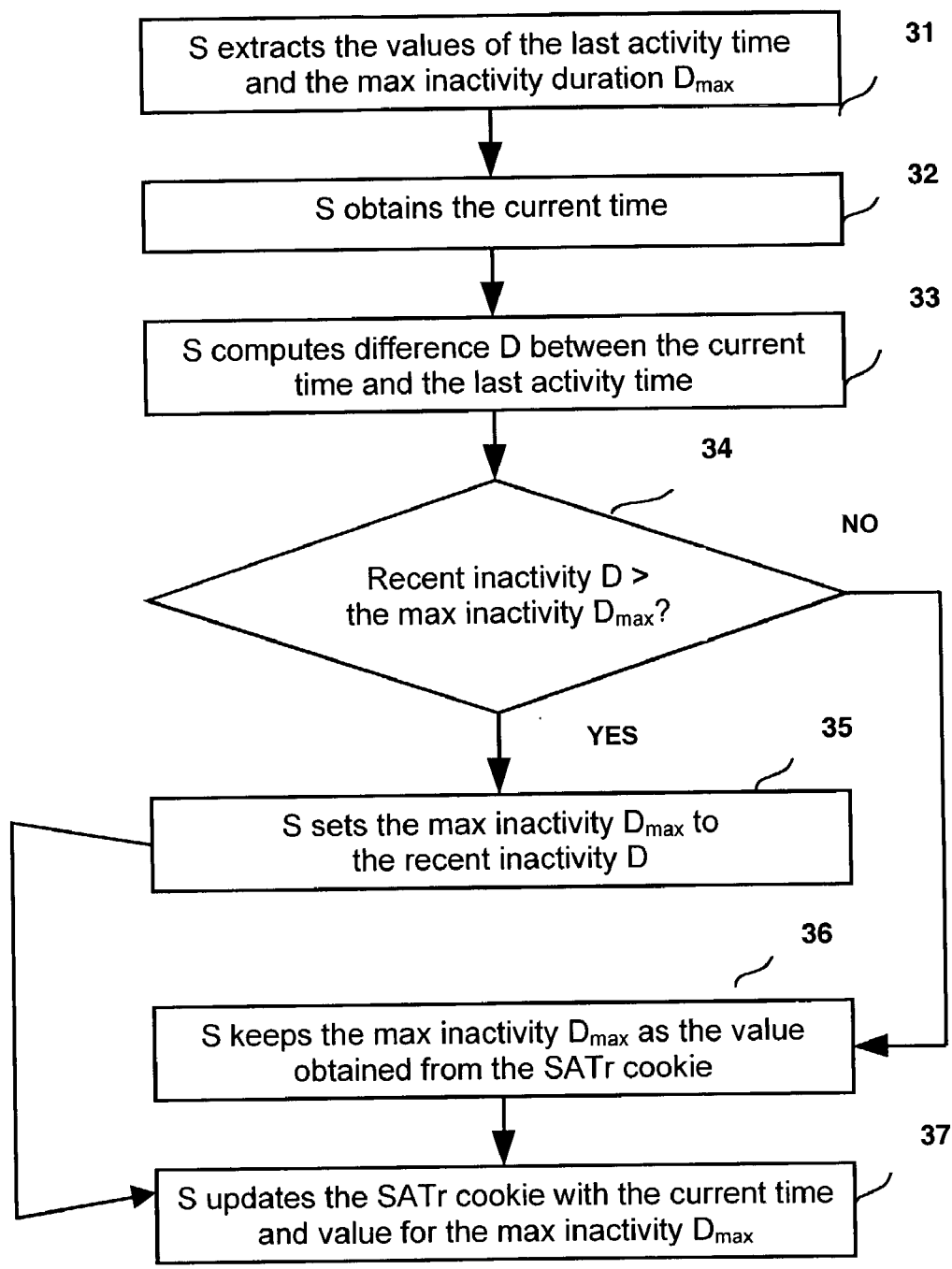

FIG. 3 illustrates the exemplary sub-steps of Step 2c in FIG. 2:

Step 31. S extracts the values of a last-activity-time and the maximum inactivity duration $D_{max}$ in S from the SATr cookie;

Step 32. S obtains the current time;

Step 33. S computes a recent duration of inactivity (D) in S by computing the difference between the current time and the last-activity-time from the SATr cookie;

Step 34. S checks whether the recent duration of inactivity (D) in S is longer than the maximum inactivity duration $D_{max}$ in S;

Step 35. If the check result in step 34 is yes, S sets the maximum inactivity duration $D_{max}$ in S to the recent duration of inactivity (D) in S, and goes to step 37;

Step 36. If the check result in step 34 is no, S keeps the maximum inactivity duration $D_{max}$ in S as the value obtained from the SATr cookie; and Step 37. S updates the SATr cookie with the current time and value for the maximum inactivity duration $D_{max}$ in S.

Figure 4:
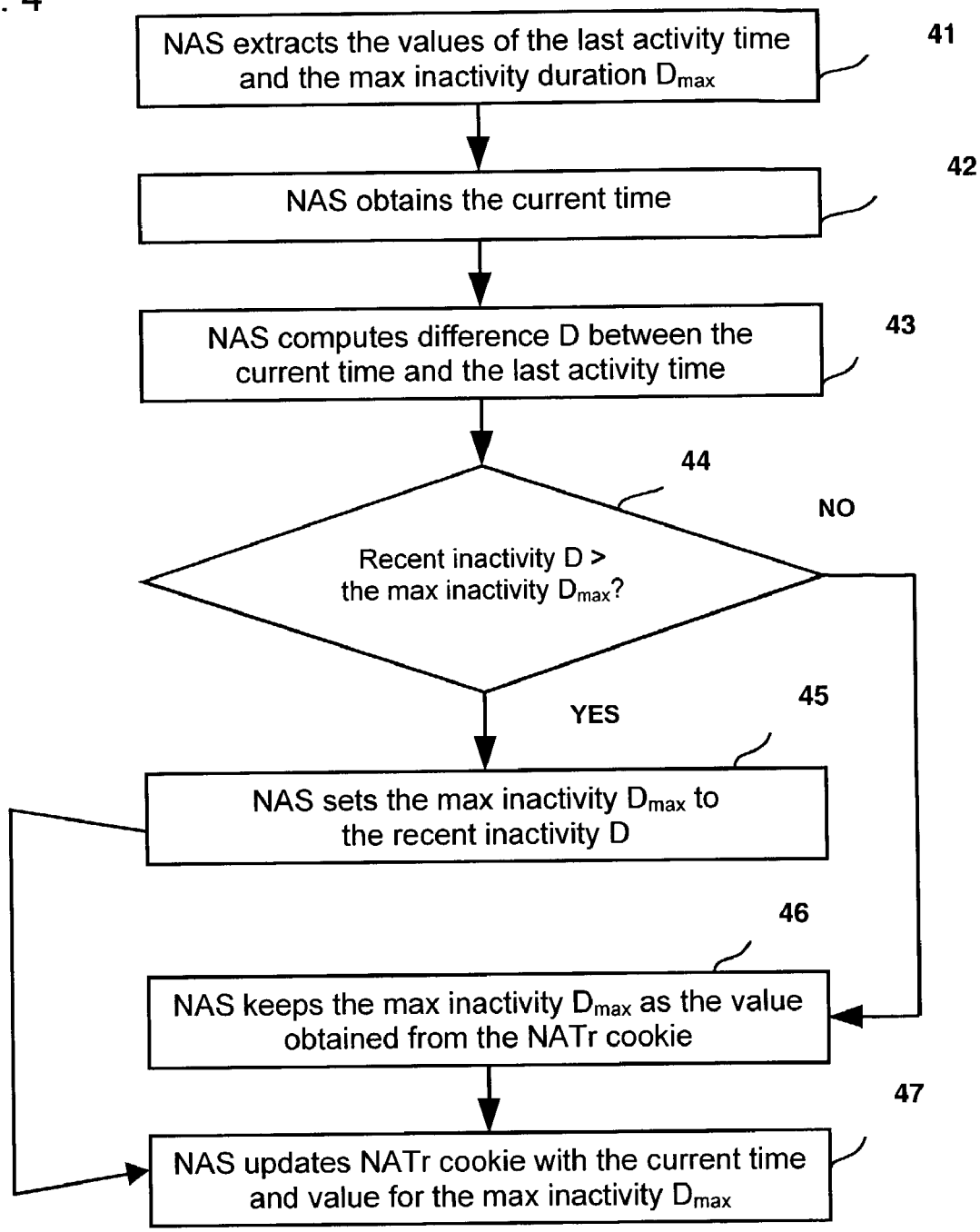

FIG. 4 illustrates the exemplary sub-steps of Step 2f in FIG. 2:

Step 41. NAS extracts the values of a last-activity-time and the maximum network-wide inactivity duration $D_{max}$ from the NATr cookie;

Step 42. NAS obtains the current time;

Step 43. NAS computes a recent duration of network-wide inactivity (D) by computing the difference between the current time and the last-activity-time from the NATr cookie (i.e., it computes recent-inactivity-duration=current-time−last-inactivity-time);

Step 44. NAS checks whether the recent duration of network-wide inactivity (D) is longer than the maximum network-wide inactivity duration $D_{max}$ in the NATr cookie;

Step 45. If the check result in Step 44 is yes, then NAS sets the maximum network-wide inactivity duration $D_{max}$ to the recent duration of network-wide inactivity (D), and goes to step 47;

Step 46. If the check result in Step 44 is no, then NAS keeps the maximum network-wide inactivity duration $D_{max}$ as the value obtained from the NATr cookie; and Step 47. NAS updates the NATr cookie with the current time and value for the maximum network-wide inactivity $D_{max}$ (i.e., NAS writes NATr cookie with parameter values last-inactivity-time=current-time, max-inactivity-duration=max-inactivity-duration).

Figure 5:
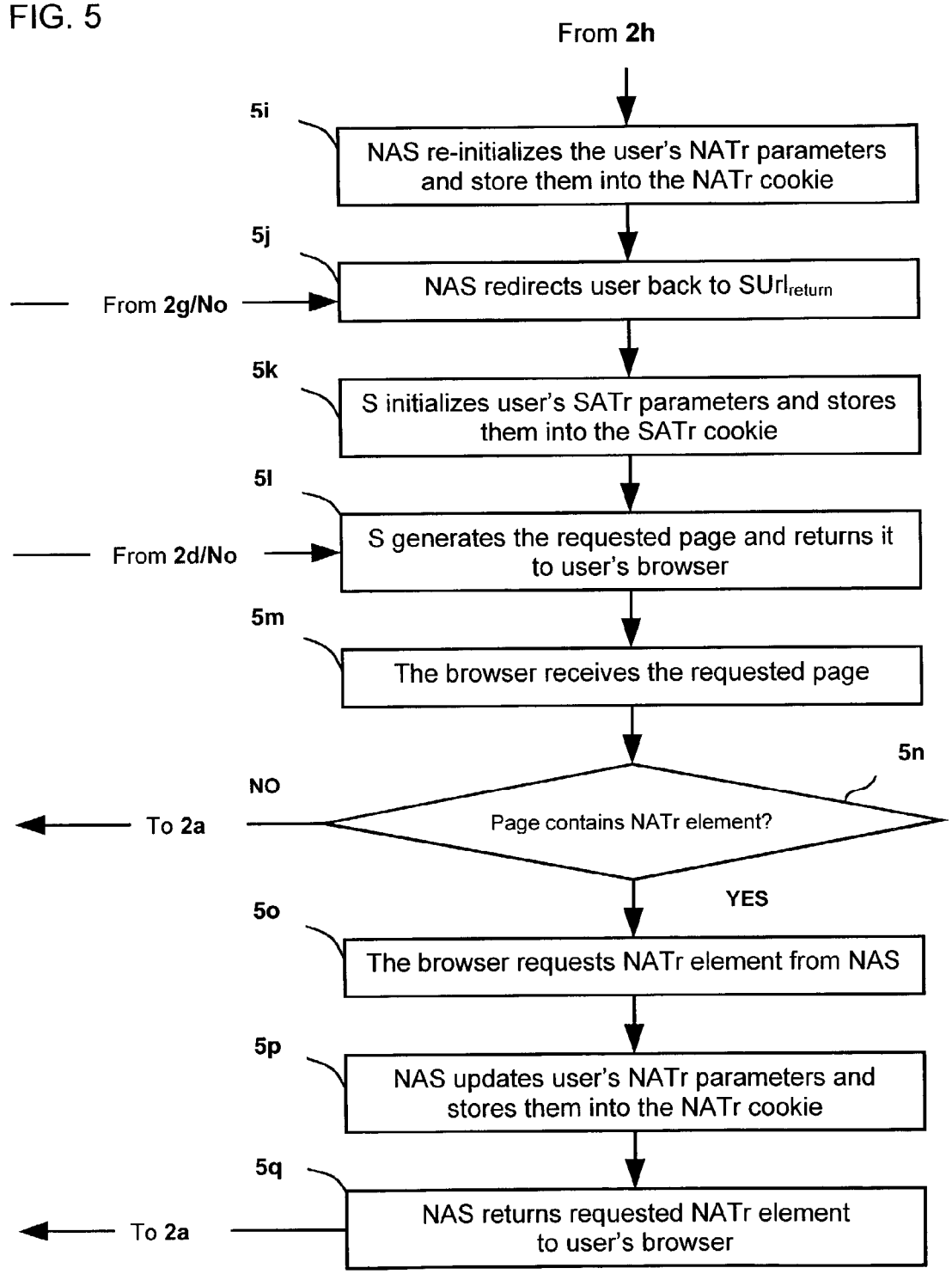

FIG. 5 illustrates one exemplary offshoot of the method illustrated in FIG. 2, which includes the steps of:

Step 5i: NAS reinitializes the user's NATr parameters and stores them into the NATr cookie;

Step 5j. NAS redirects the user back to S's return URL ($SUrl_{return}$);

Step 5k. S initializes the user's SATr parameters and stores them into the SATr cookie;

Step 5l. S generates the requested page and returns the requested page to the user's browser;

Step 5m: The browser receives the requested page;

Step 5n. The browser checks whether requested page contains an NATr element;

Step 5o. If the check result in Step 5n is yes, then the browser requests the NATr element from the NAS, wherein if the check result in Step 5n is no, then continue with Step 2a;

Step 5p. NAS updates the user's NATr parameters and stores them into the NATr cookie; and Step 5q. NAS returns the requested NATr element to the user's browser.

The NATr tracking element is included via a Javascript (JS) code snippet that itself is included via a <SCRIPT LANGUAGE="Javascript" SRC=" . . . " >tag. For a given user on a given site S, the JS snippet writes an IMG tag (with tracking element URL as described below) into an S page only once every n minutes. The JS code snippet accomplishes this by looking for the existence of a local cookie, say NAT_WAIT. If NAT_WAIT is not present, then writes the IMG tag with tracking element URL into page, and writes a NAT_WAIT cookie with expiration time n minutes in the future. Otherwise, if the local cookie NAT_WAIT cookie is present, then does not insert tracking element (just waits for the cookie to expire).

The URL of the tracking element is a specified NAS URL, for example, an actTrackUrl, which takes the following query arguments:

siteId=siteId of site on which the element is placed

The actions performed by the NAS tracking URL include (1) updating the tracking parameters in the NATr cookie as illustrated in FIG. 4 and steps 41–47, and (2) returning an image.

Note that S sometimes, but not always, inserts the NATr element in the requested page.

Figure 6:
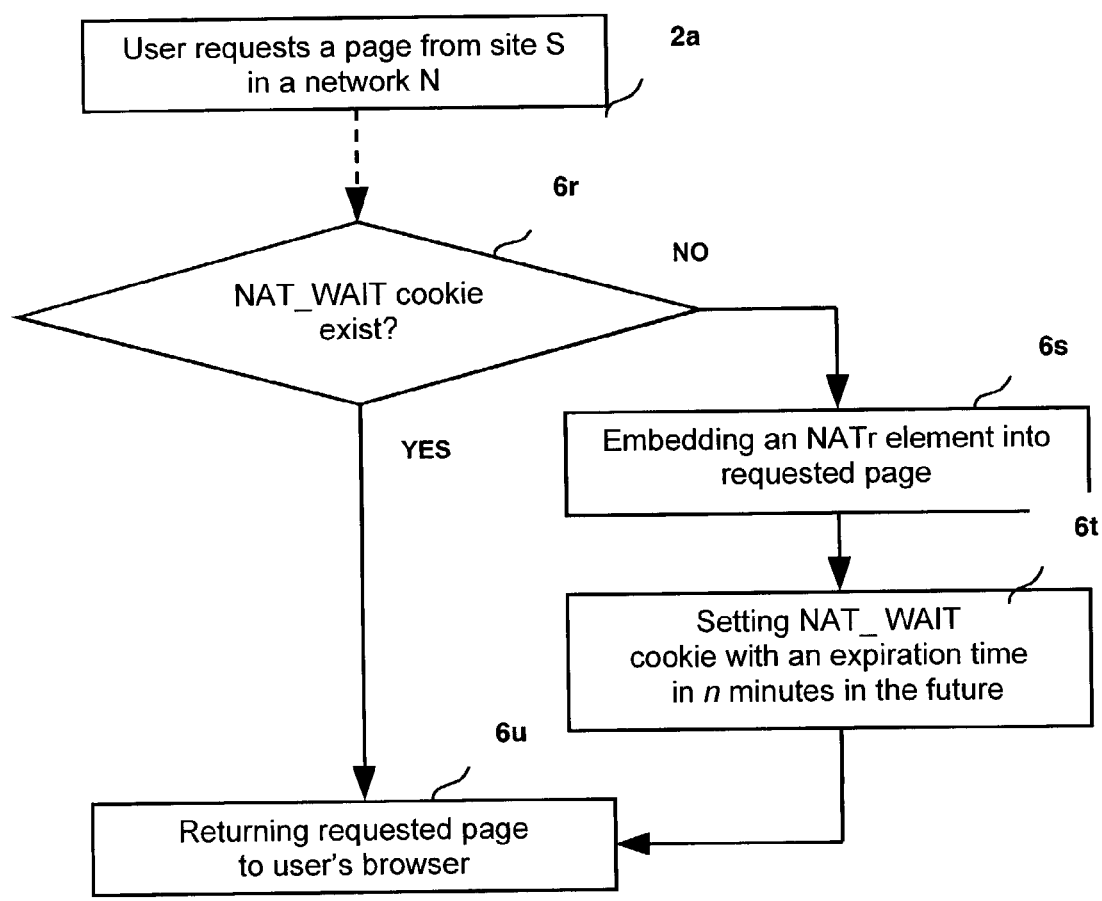

FIG. 6 illustrates the exemplary steps for controlling when the NATr element is inserted:

Step 6r. S checks whether a local NAT_WAIT cookie exists in the requested page;

Step 6s. If the check result in Step 6r is no, then S embeds an NATr element, along with an image tag, into the requested page, but if the check result in Step 6r is yes, then it is followed by Step 6u as described below;

Step 6t. S writes into the requested page the local NAT_WAIT cookie with expiration time n minutes in the future; and Step 6u. S returns the requested page to the user's browser.

The following sample code further illustrates the above steps:

```
<SCRIPT LANGUAGE="JavaScript" TYPE="text/javascript">
<!- -
    if (document.cookie.indexOf("NAT_WAIT=") >= 0) {
        // NAT_WAIT exists; not including tracker
    } else {
        // NAT_WAIT doesn't exist; including tracker
        document.writeln('<img src="<NAS-activity-tracking-URL> ">');
        var expires = new Date((new Date( )).getTime( ) + 10*1000);
        document.cookie = "NAT_WAIT=1; expires=" + expires.toGMTString( ) + "; path=/";
    }
// - ->
</SCRIPT>
```

Figure 7:
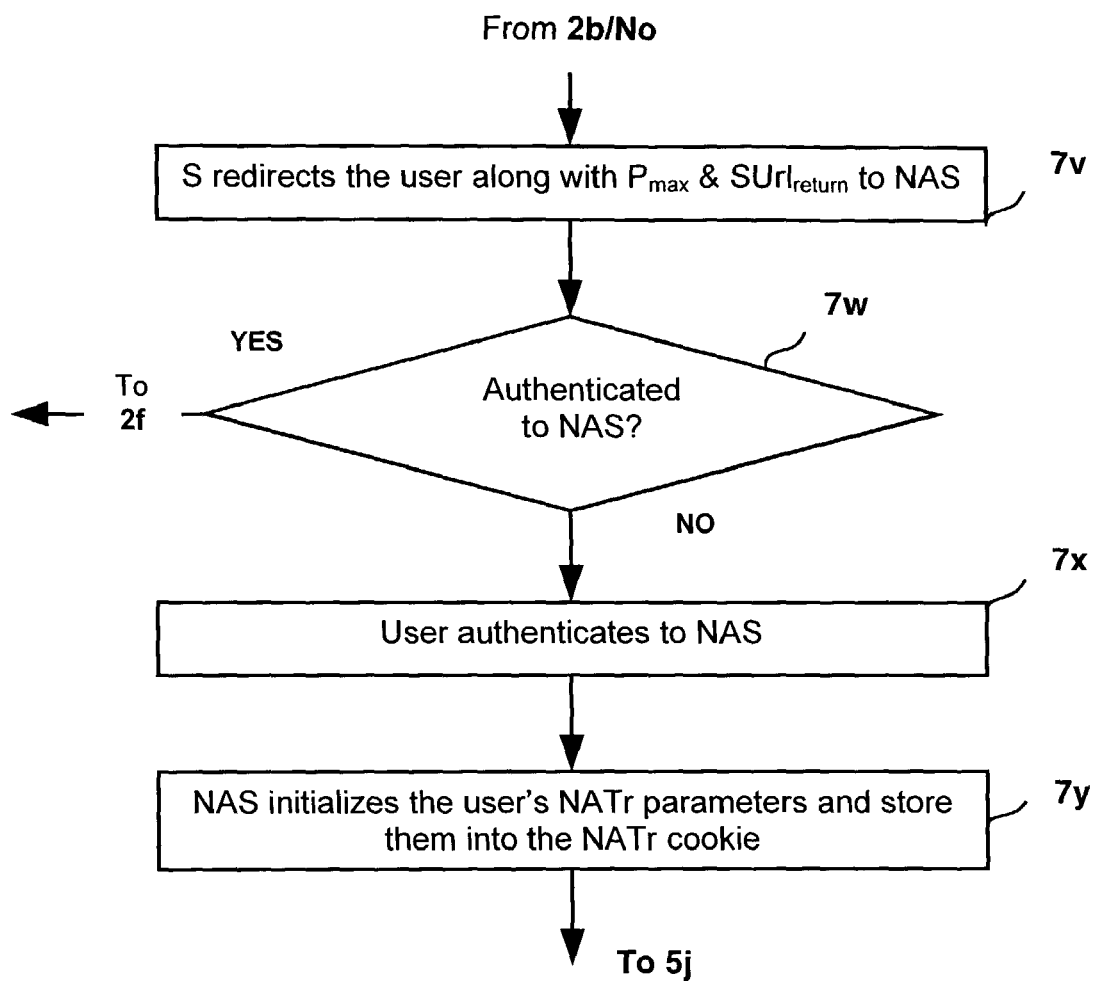

FIG. 7 illustrates another exemplary offshoot of the method illustrated in FIG. 2, which includes the steps of:

Step 7v. S redirects the user along with the $P_{max}$ and $SUrl_{return}$ to the NAS;

Step 7w. NAS checks whether the user has already been authenticated;

Step 7x. If the check result in Step 7w is yes, then continue on Step 2f in FIG. 2; and Step 7y. If the check result in Step 7w is no, then authenticate the user to the NAS, and continue with step 5j.

The method described above has the following properties: (1) constrains clock skew issues/management to within specific site server farms (i.e., NAS timestamps are compared to NAS timestamps, site S1 timestamps to site S1 timestamps, etc.); (2) centralizes overall activity tracking at the network authentication servers (NAS); (3) allows the tradeoff between tracking granularity and scalability to be adjusted via configuration parameters; and (4) delegates site-specific activity tracking and detecting/handling excessive inactivity to sites.

In the second preferred embodiment, the SATr cookies are not used at all. In place of the snippet of Javascript that uses the NAT_WAIT that causes the NAS tracking image to be periodically inserted into the site's pages, sites instead includes in their pages an HTML SCRIPT tag that causes the browser to request a Javascript activity-tracking source file from the Web server.

Figure 8:
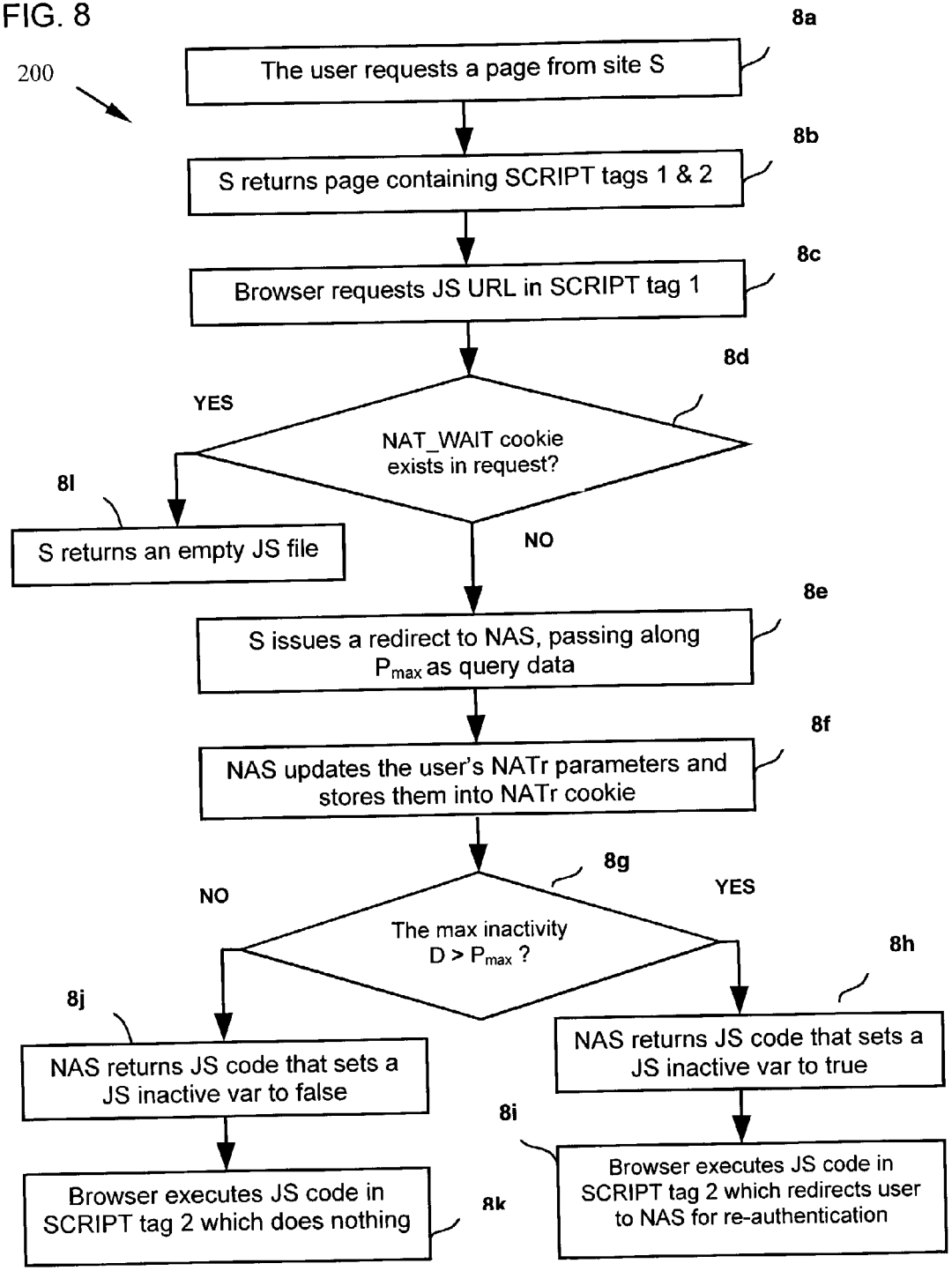
FIG. 8 is a flow diagram illustrating a method 200 in the second preferred embodiment where the SATr cookies are not used at all.

FIG. 8 is a flow diagram illustrating a method 200 in the second preferred embodiment. The method includes the steps of:

Step 8a. The user requests a page from a site in said network;

Step 8b. S returns a page containing SCRIPT tags 1 and 2 to the user's browser;

Step 8c. The browser requests from S the Javascript URL in SCRIPT tag 1;

Step 8d. S checks for existence of a local NAT_WAIT cookie in the browser request, Step 8e. If the check result in Step 8d is no, then S issues a redirect to the NAS (a new NAS activity tracking URL), passing along S's maximum allowable period of network-wide inactivity ($P_{max}$) as query data, but if the check result in step 8d is yes, then S returns an empty Javascript file (step 8l);

Step 8f. NAS updates the user's NATr parameters and stores them into the NATr cookie;

Step 8g. NAS compares the user's maximum period of network-wide inactivity to the $P_{max}$;

Step 8h. If the check result in Step 8g is yes, then NAS returns a Javascript code that sets a Javascript inactive var to true;

Step 8i. The browser executes the Javascript code in SCRIPT tag 2 which redirects the user to NAS for reauthentication;

Step 8j. If the check result in Step 8g is no, then said NAS returns a Javascript code that sets a Javascript var to false; and Step 8k. The browser executes the Javascript code in SCRIPT tag 2 which does nothing.

Note that Step 8f may include the same exemplary sub-steps as illustrated in FIG. 4.

In the third preferred embodiment, neither SATr cookies nor Javascript are used.

Figure 9:
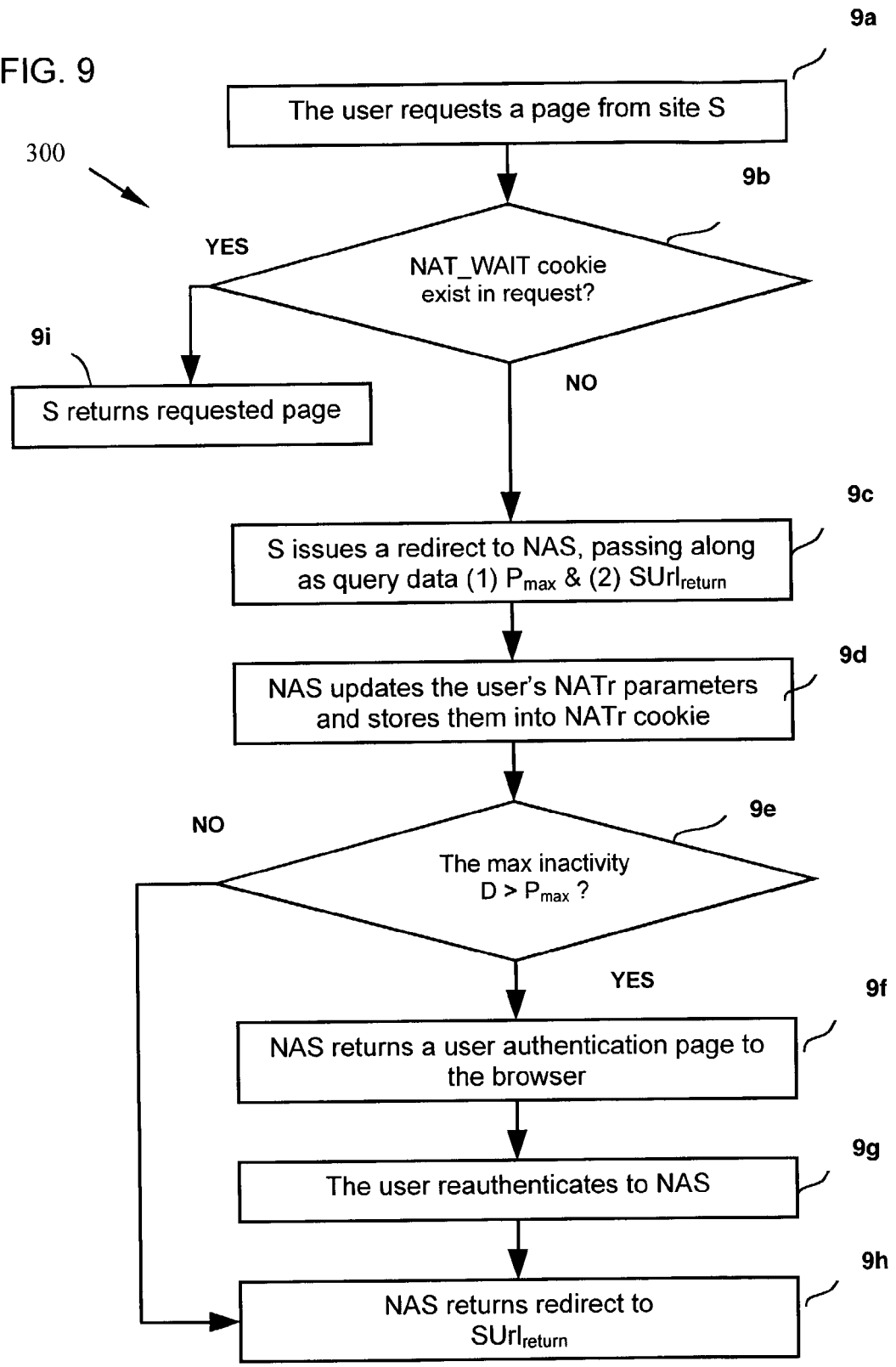
FIG. 9 is a flow diagram illustrating a method 300 in the third preferred embodiment where neither SATr cookies nor Javascript are used.

FIG. 9 is a flow diagram illustrating a method 300 in the third preferred embodiment. The method includes the steps of:

Step 9a. The user requests a page from S;

Step 9b. S checks for existence of a local NAT_WAIT cookie in the browser request;

Step 9c. If the check result in Step 9b is no, then S issues a redirect to the NAS, passing along as query data (1) S's maximum allowable period of network-wide inactivity ($P_{max}$) and (2) S's return URL ($SUrl_{return}$), but if the check result in Step 9b is yes, then S returns the requested page;

Step 9d. NAS updates the user's NATr parameters and stores them into the NATr cookie;

Step 9e. NAS compares the user's maximum period of network-wide inactivity to the $P_{max}$; and Step 9f. If the check result in Step 9e is yes, then NAS returns an authentication page to the browser, but if the check result is no, then Step 9e is followed by Step 9h;

Step 9g. NAS forces the user to authenticate; and

Step 9h. NAS returns redirect to S's return URL($SUrl_{return}$).

Note that Step 9d may include the same exemplary sub-steps as illustrated in FIG. 4.

Abbreviations and Definitions:

Authentication—The process of identifying a user before he is allowed access to computer systems or networks, typically by user-ids and passwords.

Cookie—Small bits of data that a Web site asks a browser to store on a user's computer, either in RAM or on the hard drive, and to return to the Web site upon subsequent visits by the user. It allows a Web site to "recognize" and "remember" individual visitors by storing files on their browsers with a record of the last visit.

NAS—Network Authentication Server (s).

NATr—Network-wide activity tracking.

NATr cookie—A cookie managed by an NAS to track a user's network-wide activities.

NATr parameters—A set of data included in the NATr cookie to track a user's network-wide activities.

Network—A group of two or more computer servers and clients linked together.

Network Site—A Web site affiliated with a network.

SATr—Site specific activity tracking.

$Surl_{return}$—site S return URL.

SATr cookie—A cookie managed by a network site to track a user's activities at the site.

SATr parameters—A set of data included in the SATr cookie to track a user's site specific activities.

$P_{max}$—A network site's maximum allowable inactivity period of time.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A method for monitoring Web browsing activity across a network of affiliated sites and for enabling said sites to detect and to force re-authentication upon users who have had a period of network-wide inactivity longer than a site-specific maximum allowable inactivity period, wherein said network comprises at least one network authentication server (NAS) which maintains a network-wide activity tracking (NATr) cookie, said NATr cookie comprising a set of network-wide activity tracking (NATr) parameters for each registered user, and wherein each of said sites maintains a site-specific activity tracking (SATr) cookie which comprises a set of site-specific activity tracking (SATr) parameters for each registered user, the method comprising the steps of:

(a) requesting, by a user, a page from a site in said network;

(b) checking, by said site, whether the user has already been authenticated;

(c) if the check result in step (b) is yes, then updating the user's SATr parameters and storing them into said SATr cookie;

(d) checking said SATr cookie to determine whether the user has been inactive at said site for longer than said site's maximum allowable inactivity period $P_{max}$;

(e) if the check result in step (d) is yes, then redirecting the user along with said $P_{max}$ and said site's return URL to a network authentication server (NAS) associated with said network to check the user's network-wide activity;

(f) updating, by said NAS, the user's network-wide activity tracking (NATr) parameters and storing them into said NATr cookie;

(g) inspecting the user's NATr parameters in said NATr cookie to determine whether the user has been inactive for longer than said $P_{max}$; and (h) if the check result in step (g) is yes, then forcing the user to re-authenticate.

2. The method of claim 1, further comprising the steps of:

(i) reinitializing, by said NAS, the user's NATr parameters and storing them into said NATr cookie;

(j) redirecting the user back to said site's return URL;

(k) initializing, by said site, the user's site-specific activity tracking (SATr) parameters and storing them into said SATr cookie;

(l) generating said requested page and returning said requested page to the user's browser;

(m) receiving, by the user's browser, said requested page;

(n) checking whether requested page contains a NATr element;

(o) if the check result in step (n) is yes, then requesting, by the user's browser, said NATr element from said NAS, wherein if the check result in step (n) is no, then starting from step (a);

(p) updating, by said NAS, the user's NATr parameters and storing them into said NATr cookie; and (q) returning said requested NATr element to the user's browser, and starting from step (a);

wherein if the check result of step (2d) is no, then step (2d) is followed by step (5l), and wherein if the check result of step (2g) is no, then step (2g) is followed by step (5j).

3. The method of claim 2, wherein step (i) further comprises the steps of:
(r) checking whether a local cookie exists;
(s) if the check result in step (r) is no, then embedding an NATr element, along with an image tag into said requested page;
(t) writing into said requested page the local cookie with expiration time n minutes in the future; and
(u) returning said requested page to the user's browser; wherein if the check result In step (r) is yes, then step (r) is followed by step (u).

4. The method of claim 3, wherein said embedded NATr element is placed on every page whose viewing counts towards activity.

5. The method of claim 4, wherein said NATr element is included via a JavaScript code snippet which writes the image tag into said every page every n minutes.

6. The method of claim 5, wherein said embedded NATr element comprises a specified URL for said NAS, said URL being used to: update said NATr parameters in said NATr cookie; and/or return image.

7. The method of claim 1, wherein the step (c) further comprises the steps of:
(c1) extracting, by said site, the values of a last-activity-time and the maximum inactivity duration in said site from said SATr cookie;
(c2) obtaining the current time;
(c3) computing a recent duration of Inactivity in said site by computing the difference between the current time and said last-activity-time from said SATr cookie;
(c4) checking whether said recent duration of Inactivity in said site is longer than the maximum inactivity duration in said site;
(c5) if the check result in step (c4) is yes, setting the maximum inactivity duration in said site to said recent duration of inactivity in said site;
(c6) if the check result in step (c4) is no, keeping the maximum inactivity duration in said site as the value obtained from said SATr cookie; and
(c7) updating said SATr cookie with the current time and value for the maximum inactivity duration in said site; wherein step (c5) is followed by step (c7).

8. The method of claim 1, wherein the step (f) further comprises the steps of: (f1) extracting, by said NAS, the values of a last-activity-time and the maximum network-wide inactivity duration from said NATr cookie;
(f2) obtaining the current time;
(f3) computing a recent duration of network-wide inactivity by computing the difference between the current time and said last-activity-time from said NATr cookie;
(f4) checking whether said recent duration of network-wide inactivity is longer than the maximum network-wide inactivity duration;
(f5) if the check result in step (f4) is yes, setting the maximum network-wide inactivity duration to said recent duration of network-wide inactivity;
(f6) if the check result in step (f4) is no, keeping the maximum network-wide inactivity duration as the value obtained from said NATr cookie; and
(f7) updating said NATr cookie with the current time and value for the maximum network-wide inactivity duration;
wherein step (f5) is followed by step (f7).

9. The method of claim 1, wherein if the check result in step (b) is no, then further comprising the steps of:
(v) redirecting the user along with said $P_{max}$ and said site's return URL to said NAS;
(w) checking whether the user has already been authenticated to said NAS;
(x) if the check result in step (w) is yes, then continuing on Step (f); and
(y) if the check result in step (w) is no, then authenticating the user to said NAS; wherein step (y) is followed by step (j).

10. An apparatus of network communications, comprising:
at least one client communicatively coupled to the Internet; at least two network sites communicatively coupled to the Internet;
at least one authentication server which authenticates a user via said at least one client to said network;
means for tracking the user's site-specific inactivity duration;
means for tracking the user's network-wide inactivity duration, said network-wide inactivity duration being reset whenever the user authenticates to said network;
wherein when the user requests a page from a network site in said network, said network site inspects the user's inactivity duration at said network site;
wherein if the user has been inactive in said network site longer than said network site's maximum allowable duration, said network site redirects the user to said at least one authentication server;
wherein said at least one authentication server inspects the user's maximum network-wide inactivity duration in said network;
wherein if said at least one authentication server determines that the user's maximum network-wide inactivity duration is not longer than said network site's maximum allowable inactivity duration, said network site initializes said means for tracking the user's site-specific inactivity duration;
wherein if the user's maximum network-wide inactivity duration is longer than said network site's maximum allowable inactivity duration, said at least one authentication server forces the user to re-authenticate.

11. The apparatus of claim 10, wherein if the user who requests a page from the network site has been inactive in said network site not longer than said network site's maximum allowable inactivity duration, said network site returns said requested page to the user.

12. An apparatus of network communications, comprising:
at least one client communicatively coupled to the Internet; at least two network sites communicatively coupled to the Internet, each of said network sites maintaining a site-specific activity tracking (SATr) cookie which comprises a set of site-specific activity tracking (SATr) parameters for each registered user;
at least one authentication server which authenticates a user via said at least one client to said network, said at least one authentication server maintaining a network-wide activity tracking (NATr) cookie, said NATr cookie comprising a set of network-wide activity tracking (NATr) parameters for each registered user, wherein upon the user's every authentication to said network, said NATr parameters for the user are reset;
wherein when the user requests a page from the network site in said network, said network site checks its SATr cookie to determine the user's inactivity duration at said network site;
wherein if the user has been inactive in said network site longer than said network site's maximum allowable duration, said network site redirects the user to said at least one authentication server; and wherein said at least one authentication server updates the user's NATr parameters and, if said at least one authentication server determines that the user's maximum network-wide inactivity duration longer than said network site's maximum allowable inactivity duration, then forces the user to re-authenticate.

13. The apparatus of claim 12, wherein if the user who requests a page from the network site has been inactive in said network site not longer than said network site's maximum allowable duration, said network site returns said requested page to the user.

14. The apparatus of claim 12, wherein upon updating the user's NATr parameters, if said at least one authentication server determines that the user's maximum network-wide inactivity duration is not longer than said network site's maximum allowable inactivity duration, said network site initializes the user's SATr parameters and stores them into said SATr cookie.

15. A method for monitoring Web browsing activity across a network of affiliated sites and for enabling said sites to detect and to force re-authentication upon user's who have had a period of network-wide inactivity longer than a site-specific maximum allowable inactivity period, wherein said network comprises at least one network authentication server (NAS) which maintains a network-wide activity tracking (NATr) cookie, said NATr cookie comprising a set of network-wide activity tracking (NATr) parameters for each registered user, and wherein each of said sites includes in its pages an HTML SCRIPT tag that causes the user's browser to request a Javascript activity-tracking source file from said site's Web server, the method comprising the steps of:

(a) requesting, by a user, a page from a site in said network;
(b) returning a page containing a first SCRIPT tag and a second SCRIPT tag to the user's browser;
(C) requesting, by the browser, from said site Javascript URL in said first SCRIPT tag;
(d) checking for existence of a local cookie in the browser request;
(e) if the check result in step (d) is no, then issuing a redirect to said NAS, passing along said site's maximum allowable period of network-wide inactivity ($P_{max}$) as query data, wherein if the check result of step (d) is yes, then said site returns an empty Javascript file;
(f) updating, by said NAS, the user's network-wide activity tracking (NATr) parameters and storing them into said NATr cookie;
(g) comparing the user's maximum period of network-wide inactivity to said $P_{max}$;
(h) if the user's maximum period of network-wide inactivity exceeds said $P_{max}$, then returning a Javascript code that sets a Javascript inactive var to true;
(i) executing, by the user's browser, Javascript code in said second SCRIPT tag which redirects the user to said NAS for reauthentication;
(j) If the user's maximum period of network-wide inactivity does not exceed said $P_{max}$, then returning Javascript code that sets a Javascript inactive false; and
(k) executing, by the user's browser, Javascript code in said second SCRIPT tag which does nothing.

16. The method of claim 15, wherein step (f) further comprising the steps of: (f1) extracting, by said NAS, the values of a last-activity-time and the maximum network-wide inactivity duration from said NATr cookie;

(f2) obtaining the current time;
(f3) computing a recent duration of network-wide inactivity by computing the difference between the current time and said last-activity-time from said NATr cookie;
(f4) checking whether said recent duration of network-wide inactivity is longer than the maximum network-wide inactivity duration;
(f5) if the check result in step (f4) is yes, setting the maximum network-wide inactivity duration to said recent duration of network-wide inactivity;
(f6) if the check result in step (f4) is no, keeping the maximum network-wide inactivity duration as the value obtained from said NATr cookie; and
(f7) updating said NATr cookie with the current time and value for the maximum network-wide inactivity duration; wherein step (f5) is followed by step (f7).

17. A method for monitoring Web browsing activity across a network of affiliated sites and for enabling said sites to detect and to force re-authentication upon user's who have had a period of network-wide inactivity longer than a site-specific maximum allowable inactivity period, wherein said network comprises at least one network authentication server (NAS) which maintains a network-wide activity tracking (NATr) cookie, said NATr cookie comprising a set of network-wide activity tracking (NATr) parameters for each registered user, the method comprising the steps of:

(a) requesting, by a user, a page from a site in said network;
(b) checking for existence of a local cookie in the browser request;
(c) if the check result in Step (b) is no, then issuing a redirect to said NAS, passing along as query data
  (1) said site's maximum allowable period of network-wide inactivity ($P_{max}$) and
  (2) said site's return URL,
wherein if the check result in step (b) is yes, then said site returns the requested page;
(d) updating, by said NAS, the user's network-wide activity tracking (NATr) parameters and storing them into said NATr cookie;
(e) comparing the user's maximum period of network-wide inactivity to said $P_{max}$ and
(f) if the check result in step (e) is yes, then returning, by said NAS, a authentication page to the browser;
(g) forcing the user to authenticate; and
(h) returning, by said NAS, redirect to said site's return URL; wherein if the check result of step (e) is no, then step (e) is followed by step (h).

18. The method of claim 17, wherein step (d) further comprising the steps of: (d1) extracting, by said NAS, the values of a last-activity-time and the maximum network-wide inactivity duration from said NATr cookie;

(d2) obtaining the current time;
(d3) computing a recent duration of network-wide inactivity by computing the difference between the current time and said last-activity-time from said NATr cookie;
(d4) checking whether said recent duration of network-wide inactivity is longer than the maximum network-wide inactivity duration;
(d5) if the check result in step (d4) is yes, selling the maximum network-wide inactivity duration to said recent duration of network-wide inactivity;
(d6) if the check result in step (d4) is no, keeping the maximum network-wide inactivity duration as the value obtained from said NATr cookie; and (d7) updating said NATr cookie with the current time and value for the maximum network-wide inactivity duration; wherein step (d5) is followed by step (d7).

19. A method for monitoring Web browsing activity across a network of affiliated sites and for enabling said sites to detect and to force re-authentication upon users who have had a period of network-wide inactivity longer than a site-specific maximum allowable inactivity period, wherein said network comprises at least one network authentication server (NAS) which maintains a network-wide activity tracking (NATr) cookie, said NATr cookie comprising a set of network-wide activity tracking (NATr) parameters for each registered user, and wherein each of said sites maintains a site-specific activity tracking (SATr) cookie which comprises a set of site-specific activity tracking (SATr) parameters for each registered user, the method comprising the steps of:
- updating the user's NATr parameters in said NATr cookie upon performance of each activity indicating event by the user in the network;
- updating the user's SATr parameters in said SATr cookie upon performance of each activity indicating event by the user in the site;
- determining upon request the maximum period of site-specific inactivity experienced by the user since his last network authentication;
- checking the user's network-wide inactivity if the maximum period of site-specific inactivity exceeds a predefined threshold;
- determining upon request the maximum period of network-wide inactivity experienced by the user since his last network authentication; and
- re-authenticating the user if the maximum period of network-wide inactivity exceeds the predefined threshold.

20. An apparatus of network communications, comprising:
- at least one client communicatively coupled to the Internet;
- at least two network sites communicatively coupled to the Internet, each of which includes in its pages a first SCRIP tag and a second SCRIP tag that cause a user's browser to request a Javascript activity tracking source file from said site's Web server;
- at least one authentication server which authenticates a user via said at least one client to said network, said at least one authentication server maintaining a network-wide activity tracking (NATr) cookie, said NATr cookie comprising a set of network-wide activity tracking (NATr) parameters for each registered user, wherein upon the user's every authentication to said network, said NATr parameters for the user are reset;
- wherein when the user requests a page from a site, said site's Web server checks for existence of a local cookie in the user's browser request;
- wherein if the local cookie is found, said site's Web server returns an empty Javascript file;
- wherein if the local cookie is not found, said site's Web server issues a redirect to said NAS, passing along said site's maximum allowable period of network-wide inactivity ($P_{max}$) as query data;
- wherein said NAS updates the user's network-wide activity tracking (NATr) parameters and stores them into said NATr cookie;
- wherein said NAS compares the user's maximum period of network-wide inactivity to said $P_{max}$; wherein if the user's maximum period of network-wide inactivity exceeds said $P_{max}$, said NAS returns a Javascript code that sets a Javascript Inactive var to true, and the user's browser executes the Javascript code in said second SCRIPT tag which redirects the user to said NAS for reauthentication; and
- wherein if the user's maximum period of network-wide inactivity does not exceed said $P_{max}$, said NAS returns a Javascript code that sets a Javascript inactive var to false, and the user's browser, executes the Javascript code in said second SCRIPT tag which does nothing.

21. An apparatus of network communications, comprising:
- at least one client communicatively coupled to the Internet; at least two network sites communicatively coupled to the Internet;
- at least one authentication server which authenticates a user via said at least one client to said network, said at least one authentication server maintaining a network-wide activity tracking (NATr) cookie, said NATr cookie comprising a set of network-wide activity tracking (NATr) parameters for each registered user, wherein upon the user's every authentication to said network, said NATr parameters for the user are reset;
- wherein when the user requests a page from a site, said site's Web server checks for existence of a local cookie in the user's browser request;
- wherein if the local cookie is found, said site's Web server returns the requested page; wherein if the local cookie is not found, said site's Web server issues a redirect to said NAS, passing along as query data
  (1) said site's maximum allowable period of network-wide inactivity ($P_{max}$) and
  (2) said site's return URL;
- wherein said NAS updates the user's network-wide activity tracking (NATr) parameters and stores them into said NATr cookie;
- wherein said NAS compares the user's maximum period of network-wide inactivity to said $P_{max}$;
- wherein it the user's maximum period of network-wide inactivity exceeds said $P_{max}$, said NAS returns a user authentication page to reauthenticate the user; and
- wherein if the user's maximum period of network-wide inactivity does not exceed said $P_{max}$, said NAS returns redirect to said site's return URL.

* * * * *